United States Patent [19]

Masuichi et al.

[11] Patent Number: 6,076,086

[45] Date of Patent: Jun. 13, 2000

[54] ASSOCIATE DOCUMENT RETRIEVING APPARATUS AND STORAGE MEDIUM FOR STORING ASSOCIATE DOCUMENT RETRIEVING PROGRAM

[75] Inventors: Hiroshi Masuichi; Hiroshi Umemoto; Masakazu Tateno, all of Nakai-machi, Japan

[73] Assignee: Fuji Xerox Co., Ltd., Tokyo, Japan

[21] Appl. No.: 09/041,620

[22] Filed: Mar. 13, 1998

[30] Foreign Application Priority Data

Mar. 17, 1997  [JP]  Japan ................................. 9-062610

[51] Int. Cl.$^7$ .................................................. G06F 17/30
[52] U.S. Cl. ...................................... 707/3; 707/5; 707/6
[58] Field of Search ............................. 707/3, 5, 6

[56] References Cited

U.S. PATENT DOCUMENTS

| | | | |
|---|---|---|---|
| 4,803,614 | 2/1989 | Banba et al. ................................. | 707/3 |
| 4,823,306 | 4/1989 | Barbic et al. ................................ | 707/3 |
| 4,999,790 | 3/1991 | Murayama et al. ......................... | 707/3 |
| 5,220,625 | 6/1993 | Hatakeyama et al. ...................... | 707/3 |
| 5,369,742 | 11/1994 | Kurosu et al. ............................ | 395/147 |
| 5,418,951 | 5/1995 | Damashek ................................. | 707/3 |
| 5,442,778 | 8/1995 | Pedersen et al. .......................... | 707/3 |
| 5,515,488 | 5/1996 | Hoppe et al. ............................ | 395/140 |
| 5,590,317 | 12/1996 | Iguchi et al. .............................. | 707/2 |
| 5,675,819 | 10/1997 | Schuetze ................................ | 395/760 |
| 5,724,571 | 3/1998 | Woods ....................................... | 707/3 |
| 5,754,939 | 5/1998 | Herz et al. ................................. | 707/1 |
| 5,761,496 | 6/1998 | Hattori ...................................... | 707/5 |
| 5,832,470 | 11/1998 | Morita et al. ............................. | 707/1 |
| 5,905,980 | 5/1999 | Masuichi et al. ......................... | 707/1 |
| 5,907,836 | 5/1999 | Sumita et al. ............................ | 707/2 |

FOREIGN PATENT DOCUMENTS 2-41564  2/1990  Japan .

OTHER PUBLICATIONS

Haruno et al. "Bilingual Text Alignment Using Statistical and Dictionary Information," Information Processing Society of Japan, SIG Notes, 960NL–112, pp. 23–30, 1996.

Ohmori et al. "Automated Formation of Bilingual Dictionary Using Statistical Information." Proceeding of the Second Annual Meeting of the Association for Natural Language Processing, pp. 49–52, 1996.

Shimizu, Y. "Symbolic Logic." Tokyo University Press, 1984, pp. 34–36.

*Primary Examiner*—Anton W. Fetting
*Assistant Examiner*—Jean M. Corriélus
*Attorney, Agent, or Firm*—Oliff & Berridge, PLC

[57] ABSTRACT

The present invention provides an associate document retrieving apparatus capable of associate document retrieval which reflects the relation among keywords connected by logical operators in a retrieval expression. In the apparatus, a document information storing element associates each of the documents with a keyword extracted from the document and stores the associated documents. A retrieval expression obtaining element receives a retrieval expression containing retrieval keywords that may be connected by logical operators. A number of documents calculating element specifies objective keywords from within the extracted keywords stored in the document information storing element and calculates several numbers of different kinds of documents. A degree of similarity determining element determines the degree of similarity between the retrieval expression received by the retrieval expression obtaining element and each of the objective keywords in accordance with a relationship between several numbers of documents calculated by the number of documents calculating element. A degree of association determining element obtains associate document information of a document containing any of the objective keywords and determines the degree of association between the retrieval expression and each of the documents based on the degree of similarity for each of the objective keywords and the associate document information.

14 Claims, 16 Drawing Sheets

○ : SET OF DOCUMENTS INCLUDING "AIRPLANE"
◐ : SET OF DOCUMENTS INCLUDING "AIRCRAFT"
◒ : SET OF DOCUMENTS INCLUDING "PASSENGER PLANE"
⊖ : SET OF DOCUMENTS INCLUDING "SHIP"

⊖ : SET OF DOCUMENTS RETRIEVED IN ACCORDANCE WITH RETRIEVAL EXPRESSION "(AIRPLANE) OR (AIRCRAFT) OR (PASSENGER PLANE) OR (SHIP)"

| DOCUMENT IDENTIFIER | EXTRACTED WORDS |
|---|---|
| 1 | ECONOMY, BUSINESS SITUATION, TREND, GET, NATIONAL ECONOMY CALCULATION, SHOW, INDEX,... <DATE> 19961104, <AUTH> YAMADA |
| 2 | BUSINESS SITUATION, PROSPERITY, DEPRESSION, PROCEED, TURNING POINT, GET, PREPARE,... <DATE> 19961112, <AUTH> SAITO |
| 3 | BUSINESS SITUATION, DETERMINATION, ADVANCE, MAIN, ENTERPRISE, STATE, IMPORTANT, THE BANK OF JAPAN,... <DATE> 19961112, <AUTH> TAKADA |
| 4 | THE UNITED STATES OF AMERICA, BUSINESS SITUATION, TREND, WATCH, MONEY SUPPLY, STATISTICS,... <DATE> 19961130, <AUTH> SUZUKI |
| 5 | ECONOMY, ACTIVITY, SUPPORT, PRODUCTION, MOVEMENT, GRASP, PRODUCTION INDEX,... <DATE> 19961207, <AUTH> YAMADA |
| 6 | ECONOMY, STABLE GROWTH, TRANSFER, EMPLOYMENT, STATE, GRASP, CHANGE, STATISTICS,... <DATE> 19961215, <AUTH> TAKADA |

FIG.4

WORD-WORD IDENTIFIER LIST — 24a

| WORD | WORD IDENTIFIER |
|---|---|
| THE UNITED STATES OF AMERICA | 1 |
| MONEY SUPPLY | 2 |
| GET | 3 |
| WATCH | 4 |
| STABLE GROWTH | 5 |
| TRANSFER | 6 |
| MOVEMENT | 7 |
| ACTIVITY | 8 |
| ENTERPRISE | 9 |
| BUSINESS SITUATION | 10 |
| ECONOMY | 11 |
| PROSPERITY | 12 |
| NATIONAL ECONOMY CALCULATION | 13 |
| EMPLOYMENT | 14 |
| PREPARE | 15 |
| SUPPORT | 16 |
| INDEX | 17 |
| SHOW | 18 |
| IMPORTANT | 19 |
| MAIN | 20 |
| STATE | 21 |
| ADVANCE | 22 |
| PRODUCTION INDEX | 23 |
| ... | ... |
| <DATE> 19961104 | 243245 |
| <DATE> 19961112 | 243246 |
| <DATE> 19961130 | 243247 |
| ... | ... |
| <AUTH> SAITO | 301129 |
| <AUTH> SUZUKI | 301130 |
| <AUTH> TAKADA | 301131 |
| ... | ... |

WORD IDENTIFIER-DOCUMENT IDENTIFIER LIST — 24b

| WORD IDENTIFIER | DOCUMENT IDENTIFIER |
|---|---|
| 1 | 4,... |
| 2 | 4,... |
| 3 | 1,2,... |
| 4 | 4,... |
| 5 | 6,... |
| 6 | 6,... |
| 7 | 5,... |
| 8 | 5,... |
| 9 | 3,... |
| 10 | 1,2,3,4,... |
| 11 | 1,5,6,... |
| 12 | 2,6,... |
| 13 | 1,... |
| 14 | 6,... |
| 15 | 2,... |
| 16 | 5,... |
| 17 | 1,... |
| 18 | 1,... |
| 19 | 3,... |
| 20 | 3,... |
| 21 | 3,... |
| 22 | 3,... |
| 23 | 5,... |
| ... | ... |
| 243245 | 1,... |
| 243246 | 2,3,... |
| 243247 | 4,... |
| ... | ... |
| 301129 | 2,... |
| 301130 | 4,... |
| 301131 | 3,6,... |
| ... | ... |

DOCUMENT IDENTIFIER-WORD IDENTIFIER LIST  24c

| DOCUMENT IDENTIFIER | WORD IDENTIFIER |
|---|---|
| 1 | 3,10,11,13,17,18, ··· ,243245, ··· |
| 2 | 3,10,12,15, ··· ,243246,301129, ··· |
| 3 | 3,10,19,20,21,22, ··· ,243246,301131, ··· |
| 4 | 1,2,4,10, ··· ,243247,301130, ··· |
| 5 | 7,8,11,16,23, ··· |
| 6 | 5,6,11,12,14, ··· ,301131, ··· |

FIG.7

RETRIEVAL ACCORDING TO THE PRESENT INVENTION

RETRIEVAL EXPRESSION: (BATH) OR (BATH FURNACE) OR (BATHTUB) OR (HOT-WATER SUPPLY) OR (TOILET)

1. HEATING, HOT-WATER SUPPLY AND 24-HOUR BATHING SYSTEM
2. HEATING, HOT WATER SUPPLY AND 24-HOUR BATHING SYSTEM
3. BED SERVING AS BATHTUB, TOILET DETACHABLE THEREFROM, AND BED, BATH AND TOILET SYSTEM USING THEREOF
4. WATER PURIFYING APPARATUS
5. HOT-WATER SUPPLIER FOR BATH WITH EXHAUST HEAT RECOVERY FUNCTION AND METHOD OF SUPPLYING HOT WATER USING RECOVERED EXHAUST HEAT
6. ADAPTER FOR BATH AND HOT-WATER SUPPLYING SYSTEM USING THEREOF
7. FUNCTIONAL UNIT FOR TOILET
8. WATER CIRCULATING AND PURIFYING APPARATUS FOR TEMPORARY TOILET USING FLUSHING WATER CIRCULATING METHOD
9. MANTLE FOR PORTABLE TOILET, TOILET STOOL AND RECEIVING BAG
10. TOILET UNIT AND OPENING ADJUSTING MATERIAL
11. FLUSH TOILET STOOL AND TOILET UNIT HAVING AUTOMATIC FLUSHING DEVICE
12. METHOD OF REUSING DOMESTIC SEWAGE FOR FLUSHING WATER OF TOILET STOOL
13. FLUSH TOILET SYSTEM USING HOT-WATER
14. EXCREMENT PROCESSING UNIT FOR FLUSH TOILET WHEN WATER SUPPLY IS CUT OFF
15. TOILET STOOL FIXER FOR TOILET SYSTEM
16. PIPING UNIT AND PIPE CASE AND FRONT BOARD OF THE SAME
17. TOILET APPARATUS
18. HEATING AND 24-HOUR BATHING SYSTEM
19. URINE ANALYZER FOR FLUSH TOILET
20. HOT-WATER SUPPLYING DEVICE

FIG.12A

RETRIEVAL ACCORDING TO CONVENTIONAL ART

RETRIEVAL EXPRESSION: (BATH) OR (BATH FURNACE) OR (BATHTUB) OR (HOT-WATER SUPPLY) OR (TOILET)

1. HEATING, HOT-WATER SUPPLY AND 24-HOUR BATHING SYSTEM
2. CONTROLLING METHOD OF WATER POURING INTO BATHTUB
3. HOT-WATER SUPPLIER FOR BATH WITH EXHAUST HEAT RECOVERY FUNCTION AND METHOD OF SUPPLYING HOT-WATER USING RECOVERED EXHAUST HEAT
4. HEATING AND 24-HOUR BATHING SYSTEM
5. ADAPTER FOR BATH AND HOT-WATER SUPPLYING SYSTEM USING THEREOF
6. 24-HOUR BATHING SYSTEM
7. HEATING AND 24-HOUR BATHING SYSTEM
8. BED SERVING AS BATHTUB, TOILET DETACHABLE THEREFROM, AND BED, BATH AND TOILET SYSTEM USING THEREOF
9. HOT-WATER SUPPLIER FOR BATH AND METHOD OF HOT-WATER SUPPLY
10. ADAPTER FOR BATH
11. WATER PURIFYING AND HEAT RETAINING APPARATUS FOR BATH USING CIRCULATING METHOD
12. BATHING SYSTEM
13. HOT-WATER SUPPLIER FOR BATH AND METHOD OF HOT-WATER SUPPLY
14. BATHING WATER PURIFYING AND STERILIZING DEVICE AND 24-HOUR BATH ACCOMMODATING BATHING AGENT
15. HOT-WATER SUPPLYING DEVICE FOR BATH ACCOMMODATING SOLAR SYSTEM
16. BATHING SYSTEM CAPABLE OF CONTROLLING HOT-WATER SUPPLY AND AFTER-HEATING
17. METHOD OF CALCULATING SECTIONAL AREA OF BATHTUB AND METHOD OF CONTROLLING WATER POURING IN AUTOMATIC BATHING SYSTEM
18. METHOD OF CONTROLLING BATH FURNACE
19. BATHING APPARATUS
20. AUTOMATIC WATER POURING DEVICE FOR BATH

FIG.12B

RETRIEVAL ACCORDING TO THE PRESENT INVENTION

RETRIEVAL EXPRESSION: (<ipc>A61H) AND (MAGNETISM)

1. MUFFLER WITH PROTRUDING PORTIONS AND POCKETS
2. PILLOW
3. MAGNETIC NET APPLIED TO SCALP
4. BED FOR DEMENTIA PATIENT
5. TROUSERS WITH A STOMACH BAND
6. SLEEPING DEVICE
7. ELECTRIC HEATING APPLIANCE
8. METHOD OF PREVENTING BEDSORE AND FLUID BED USED THEREFOR
9. BLOOD CIRCULATION ACCELERATING METHOD AND BLOOD CIRCULATION ACCELERATING DEVICE
10. HEALTH CARE APPLIANCE
11. HEALTH CARE APPLIANCE FOR PREVENTING MUSCLE STIFFNESS OF SHOULDER
12. CONDUCTOR USED FOR ELECTRIC SCALP MASSAGE
13. OXYGEN SUPPLYING DEVICE FOR BATHING
14. BLOOD CIRCULATION ACCELERATING DEVICE
15. KNEADER
16. DIODE ACUPUNCTURE
17. MAGNETIC TREATMENT APPARATUS
18. FAR INFRARED RAY RADIATING MATERIAL
19. AIR MASSAGE DEVICE
20. FINGER MASSAGE DEVICE

FIG.13A

RETRIEVAL ACCORDING TO CONVENTIONAL ART

RETRIEVAL EXPRESSION: (<ipc>A61H) AND (MAGNETISM)

1. MAGNETRON CONVERTING ELEMENT
2. DATA CARRIER, IDENTIFYING METHOD THEREOF AND IDENTIFYING DEVICE
3. EASY-ADHESIVE WHITE POLYESTER FILM
4. ABATEMENT PUNCHING SYSTEM FOR CARDS
5. OPTICAL RECORDING MEDIUM AND REPRODUCING METHOD
6. SOLDER DUMP CONNECTING METHOD
7. ELECTROMAGNETIC COOKING MACHINE
8. MAGNETIC RECORDING MEDIUM HAVING BACK COATING CONTAINING POLYMER PARTICLES
9. MATERIAL FOR UNDERGOING FINE PROCESSING AND FINE PROCESSING METHOD
10. MAGNETIC COMPLEX FIBER
11. MAGNETIC POWDER
12. OPTICAL SYSTEM FOR INFORMATION RECORDING AND REPRODUCING
13. MANUFACTURING METHOD OF SURFACE TREATED STEEL SHEET WITH GOOD PRESS WORKING CAPABILITY
14. SURFACE TREATED STEEL SHEET WITH GOOD PRESS WORKING CAPABILITY AND MANUFACTURING METHOD THEREOF
15. MANUFACTURING METHOD OF OPTICAL FIBER MODULE AND RECEPTACLE CONNECTOR FOR OPTICAL FIBER MODULE
16. MAGNETIC MICRO CAPSULE DISPLAY BOARD HAVING LIGHT-ACCUMULATING PHOSPHOR
17. ADJUSTABLE CLUTCH
18. CARRIER FOR DEVELOPING ELECTROSTATIC IMAGE
19. METHOD OF NITRIFICATION AND DENITRIFICATION AND APPARATUS USING THE SAME
20. NITRIFICATION AND DENITRIFICATION APPARATUS

FIG.13B

RETRIEVAL EXPRESSION: (<IPC>G06F) AND ((ASSOCIATE WORD) OR (SIMILAR WORD) OR (THESAURUS) OR (STATISTICAL VALUE))

| | | PERSON A | PERSON B | PERSON C | AVERAGE | AVERAGE PRECISION | RATIO OF AVERAGE PRECISION TO (1) | RATIO OF AVERAGE PRECISION TO (1) |
|---|---|---|---|---|---|---|---|---|
| (1) COMPLETE MATCH RETRIEVAL *1 | THE NUMBER OF HITS | 16 | 16 | 16 | 16.0 | — | — | — |
| | THE NUMBER OF RELEVANT PATENT APPLICATIONS | 2 | 1 | 2 | 1.7 | 10.6% | (1) | (1) |
| (2) ASSOCIATE DOCUMENT RETRIEVAL *2 (PRESENT INVENTION) | THE NUMBER OF HITS | 30 | 30 | 30 | 30.0 | — | — | — |
| | THE NUMBER OF RELEVANT PATENT APPLICATIONS | 4 | 5 | 3 | 4.0 | 13.3% | 1.25 | 2.35 |
| (3) ASSOCIATE DOCUMENT RETRIEVAL *3 (CONVENTIONAL ART) | THE NUMBER OF HITS | 30 | 30 | 30 | 30.0 | — | — | — |
| | THE NUMBER OF RELEVANT PATENT APPLICATIONS | 1 | 1 | 1 | 1.0 | 3.3% | 0.31 | 0.59 |

*1 FULL TEXT RETRIEVAL APPLIED TO "TITLE OF THE INVENTION"/"SUMMARY"

*2 30 ASSOCIATE DOCUMENTS IN HIGHER RANKS EXCEPT THE RESULT OF RETRIEVAL (1)

*3 30 ASSOCIATE DOCUMENTS IN HIGHER RANKS NOT CONSIDERING DESIGNATION OF IPC (IN ACCORDANCE WITH RETRIEVAL EXPRESSION (ASSOCIATIVE WORD) OR (SIMILAR WORD) OR (THESAURUS) OR (STATISTICAL VALUE)), EXCEPT THE RESULT OF RETRIEVAL (1)

ASSOCIATE DOCUMENT RETRIEVING APPARATUS AND STORAGE MEDIUM FOR STORING ASSOCIATE DOCUMENT RETRIEVING PROGRAM

BACKGROUND OF THE INVENTION

1. Field of the Invention

The present invention relates to an associate document retrieving apparatus and a storage medium for storing an associate document retrieving program. In particular, the invention relates to an associate document retrieving apparatus for executing retrieval of an associate document taking into consideration the similarity between a retrieval expression and each of a set of keywords. The invention also relates to a storage medium for storing an associate document retrieving program which allows a computer to function as the associate document retrieving apparatus giving consideration to the similarity between a retrieval expression and each of a set of keywords.

2. Discussion of the Related Art

In a retrieval system which deals with an enormous amount of documents, a retrieval method using keywords is generally adopted. When an arbitrary keyword (retrieval word) is inputted into the retrieval system as a retrieval condition, all the documents containing the keyword are obtained as a result of the retrieval. The retrieval according to this method is called a full text retrieval. Also, another method is widely used in which one or more keywords for retrieval are added to each document in advance and the document having the keyword that matches an inputted retrieval word is obtained as a result of the retrieval.

However, according to the above-described retrieval systems, only the documents containing the retrieval word inputted by a user or the documents to which the retrieval word is added by a user, may be obtained. Therefore, these retrieval systems cannot comprehensively obtain all the documents requested by the user because a complete match between the retrieval word and the keywords is required.

Consequently, the technique of so-called associate document retrieval has been proposed. This technique outputs results of retrieval similar in meaning to the result of the retrieval directly obtained by the retrieval word as well as the result of retrieval completely matching the retrieval word inputted by the user.

The associate document retrieval can be realized by providing a value of similarity quantitatively analyzed according to some criterion, also called a degree of similarity between the words. When a user inputs a retrieval word, documents containing many words having large degrees of similarity to the retrieval word (namely, similar words) are outputted (that is, documents having a higher degree of matching are outputted) and thereby, associate document retrieval can be realized. The associate document retrieval has more advantages than the complete-match retrieval. These advantages include less oversight necessary for retrieval and the results of retrieval can be outputted in order of degree of matching.

In a general keyword retrieval system, the retrieval is executed using a retrieval expression which connects retrieval words by logical operators such as "and" and "or". To actually utilize the associate document retrieval in the retrieval system, it is necessary to execute the calculation of the degree of similarity for not just a single retrieval word, but a whole retrieval expression. In other words, it is necessary to calculate the degree of similarity between a retrieval expression and a document, hereinafter referred to as the degree of association.

Japanese Patent Application Laid-Open No. Hei. 2-41564 (1990) discloses a conventional method of associate document retrieval in which the degree of association for a retrieval word is used. For example, procedures of associate document retrieval according to the disclosed method assuming that the keywords are "word 1", "word 2" and "word 3" and the retrieval expression is "(word 1) or (word 2) or (word 3)", are as follows.

In the first step, the degree of similarity is provided to every binary combination in all of the keywords in advance. It is assumed that the degree of similarity between the keywords "word a" and "word b" is represented as S (a, b) (or S (b, a)).

In the second step, values of the degree of similarity $Ri_1$, $Ri_2$ and $Ri_3$ between each of the keywords "word 1", "word 2" and "word 3" and a group of keywords contained in a document Di {word $i_1$, word $i_2$, ..., word $i_m$} are obtained by the following equations:

$$Ri_1 = S(i_1, 1) \oplus S(i_2, 1) \oplus \ldots \oplus S(i_m, 1)$$

$$Ri_2 = S(i_1, 2) \oplus S(i_2, 2) \oplus \ldots \oplus S(i_m, 2)$$

$$Ri_3 = S(i_1, 3) \oplus S(i_2, 3) \oplus \ldots \oplus S(i_m, 3) \quad (1)$$

("$\oplus$" in the equation indicates generalized sum operation).

In the third step, the degree of association Ki between the document Di and the retrieval expression "(word 1) or (word 2) or (word 3)" is obtained according to the following equation:

$$Ki = Ri_1 \oplus Ri_2 \oplus Ri_3 \quad (2)$$

("$\oplus$" in the equation indicates generalized sum operation).

In the fourth step, the processes for the document Di in the second and third steps are applied to all documents which are the object of retrieval. The documents are outputted in descending order of the value of Ki.

According to the above procedures, it becomes possible to output the results of retrieval in the order of the degree of association. The results include not only the documents completely matching the retrieval expression "(word 1) or (word 2) or (word 3)" but also the documents closely associated with the retrieval expression.

However, in the associate document retrieval of the conventional art, the following problems arise because the degree of association is calculated based on the degree of similarity provided to the relation of the binary combination of the words in advance. Therefore, it is difficult to execute the associate document retrieval practically.

The first problem is that it is impossible to obtain the result of retrieval which reflects the relation among keywords connected by the logical expression in the retrieval expression.

In the case where the degree of association is calculated based on the degree of similarity provided to the relation of the binary combination of the words, there is no way to make the degree of association reflect the relation among the keywords connected by the logical operators in the retrieval expression except by algebraically calculating the degree of association. However, it is difficult to represent the relation among the keywords connected in the retrieval expression by an algebraic calculation. Accordingly, it is impossible to obtain an accurate result of associate document retrieval for a retrieval expression created by connecting the keywords with logical operators only on the basis of the degree of similarity of the binary combination of the words.

For example, it is assumed that "(airplane) or (aircraft) or (passenger plane) or (ship)" is given as a retrieval expression. In the associate document retrieval according to the conventional art, the sum of the values of the degree of similarity for each of the keywords "airplane", "aircraft", "passenger plane" and "ship" is obtained, and thereby the degree of association between the retrieval expression "(airplane) or (aircraft) or (passenger plane) or (ship)" and each of the documents is determined. According to this calculation method, values of the degree of similarity corresponding to respective keywords "airplane", "aircraft", "passenger plane" and "ship" receive a fair deal. Since "airplane", "aircraft" and "passenger plane" have many common similar words (words having a higher degree of similarity). Many documents related to the keyword "airplane" ("aircraft" or "passenger plane") appear in the result of associate document retrieval and only a small number of documents are related to "ship". In other words, using words for which the user knows many synonyms has great influence on the degree of association and therefore, the results of associate document retrieval.

In another example, assume that "(airplane) or (ship)" is given as the retrieval expression. In the associate document retrieval of the conventional art, the degree of association between the retrieval expression "(airplane) or (ship)" and each of the documents is determined by obtaining the sum of the values of the degree of similarity for the keywords "airplane" and "ship". Accordingly, in the result of associate document retrieval, the documents related to both "airplane" and "ship" have priority over the documents related to either "airplane" or "ship". However, the retrieval expression "(airplane) or (ship)" means that either "airplane" or "ship" is included. Therefore, it is inappropriate that the priority is given to the documents having a high degree of association with both "airplane" and "ship" as the result of retrieval. Giving a priority to the documents having a higher degree of association with both "airplane" and "ship" as a result of retrieval may be considered to correspond to the retrieval expression "(airplane) and (ship)".

A second problem arises in that it is impossible to execute retrieval effectively utilizing designation of bibliographic items included in a retrieval expression.

In many cases, the retrieval expression used in the actual retrieval system includes not only the keywords but also designation of various bibliographic items. However, in the associate document retrieval according to the conventional art, the degree of association is determined based only on the relation of binary combination of the words provided in advance. Therefore, the retrieval expression used in the calculation of the degree of association is limited to those consisting of keywords.

For example, consider the case where the associate document retrieval is executed according to the retrieval expression "(PD=19950101: 19951231) and (FK=game)". The retrieval expression is assumed to mean "a set of documents published in 1995 and containing the keyword "game"". In this case, what is desired as the result of associate document retrieval is the documents related to the "document published in 1995 and describing a game". Therefore, if a document is related to such a document, it is desirable to obtain it though it was published in a year other than 1995.

However, the associate document retrieval according to the conventional art cannot deal with such a retrieval expression. Even if the associate documents are obtained based on the keyword "game" and are then narrowed down by the condition "documents published in 1995", the result is that "documents published in 1995" among the documents related to "documents describing a game regardless of the year of publication" are obtained.

SUMMARY OF THE INVENTION

The present invention has been made in view of the above circumstances and has as an object to provide an associate document retrieving apparatus capable of executing associate document retrieval reflecting relationships among keywords in a retrieval expression connected by logical operators.

Another object of the present invention is to provide a storage medium for storing an associate document retrieving program which allows a computer to implement the function of associate document retrieval.

To achieve these objects, in accordance with the purpose of the invention, as embodied and broadly described herein, the present invention provides an associate document retrieving apparatus which retrieves documents related to an inputted retrieval condition. The associate document retrieving apparatus includes a document information storing element for associating each of the documents with a keyword extracted from the document and storing them, a retrieval expression obtaining element for receiving a retrieval expression that contains retrieval keywords connected by logical operators. The apparatus further includes: (1) a number of documents calculating element for specifying plural objective keywords from within the extracted keywords stored in the document information storing element and for calculating a first number of all the documents stored in the document information storing element; (2) a second number of documents within the documents stored in the document information storing element that match the retrieval expression received by the retrieval expression obtaining element; (3) a third number of documents within the documents stored in the document information storing element containing each of the objective keywords and matching the retrieval expression received by the retrieval expression obtaining element for each of the objective keywords; and (4) a fourth number of documents within the documents stored in the document information storing element containing each of the objective keywords for each objective keyword. The apparatus also includes a degree of similarity calculating element for calculating a degree of similarity between the retrieval expression received by the retrieval expression obtaining element and each of the objective keywords. This calculation is based on an equation that includes the first number, second number, third number and fourth number for each of the objective keywords calculated by the number of documents calculating element as variables in the equation. The apparatus also includes a degree of association calculating element for obtaining associate document information of a document containing any of the objective keywords from the document information storing element and calculating a degree of association between the retrieval expression received by the retrieval expression obtaining element and each of the documents stored in the document information storing element based on the degree of similarity for each of the objective keywords obtained by the degree of similarity calculating element and the associate document information.

In the associate document retrieving apparatus according to the present invention, when a user inputs a retrieval expression connecting plural retrieval keywords by logical operators, it is received by the retrieval expression obtaining element. Then, the number of documents calculating element calculates the first number, second number, third number for each of the objective keywords and fourth number for each of the objective keywords. The degree of similarity calculating element calculates the degree of similarity between the retrieval expression inputted by the user and each of the objective keywords in accordance with an equation including the first, second, third and fourth numbers as variables. The degree of association calculating element calculates the degree of association between the retrieval expression inputted by the user and each of the documents stored in the document storing element. Thereby, the degree of similarity between the retrieval expression and each of the keywords is directly obtained and the degree of association reflecting the relationship among the retrieval keywords connected by the logical operators in the retrieval expression is also available.

To overcome the above-described problems, the present invention further provides a storage medium readable by a computer on which is stored a set of program instructions executable by the computer to perform the function of retrieving documents related to a retrieval condition inputted by a user. The function comprises the steps of: (1) associating each of documents with a keyword extracted from the document and storing them; (2) receiving a retrieval expression connecting retrieval keywords by logical operators; (3) specifying plural objective keywords from within the extracted keywords; (4) calculating a first number of all the stored documents, a second number of documents matching the retrieval expression within the stored documents, a third number of documents containing each of the objective keywords within the stored documents and matching the retrieval expression for each of the objective keywords, and a fourth number of documents containing each of the objective keywords within the stored documents for each of the objective keywords; (5) calculating a degree of similarity between the retrieval expression and each of the objective keywords based on an equation including the first number, second number, third number for each of the objective keywords and fourth number for each of the objective keywords as variables; and (6) obtaining associate document information of a document containing any of the objective keywords as the extracted keyword and calculating a degree of association between the retrieval expression and each of the stored documents based on the degree of similarity for each of the objective keywords and the associate document information.

By having a computer execute the associate document retrieving program stored in the storage medium, the above functions are implemented quickly and accurately in the computer. As a result, it becomes possible to construct a computer that performs the function of associate document retrieval with accurate determination of the similarity between the retrieval condition and the keywords.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate a preferred embodiment of the invention and, together with the description, serve to explain the objects, advantages and principles of the invention. In the drawings:

FIG. 4 shows an example of a list of the result of morphological analysis stored in a morphological analysis element;

FIG. 5 shows an example of a word-word identifier list;

FIG. 6 shows an example of a word identifier-document identifier list;

FIG. 7 shows an example of a document identifier-word identifier list;

FIGS. 12(A) and 12(B) show results of retrieval of associate documents in accordance with a retrieval expression (FIG. 12(A) shows the result of retrieval according to the present invention and FIG. 12(B) shows the result of retrieval according to the conventional method);

FIGS. 13(A) and 13(B) show results of retrieval of associate documents in accordance with another retrieval expression (FIG. 13(A) shows the result of retrieval according to the present invention and FIG. 13(B) shows the result of retrieval according to the conventional method); and FIG. 14 shows a result of retrieval in accordance with a third retrieval expression.

DETAILED DESCRIPTION OF THE PREFERRED EMBODIMENT

Figure 1:
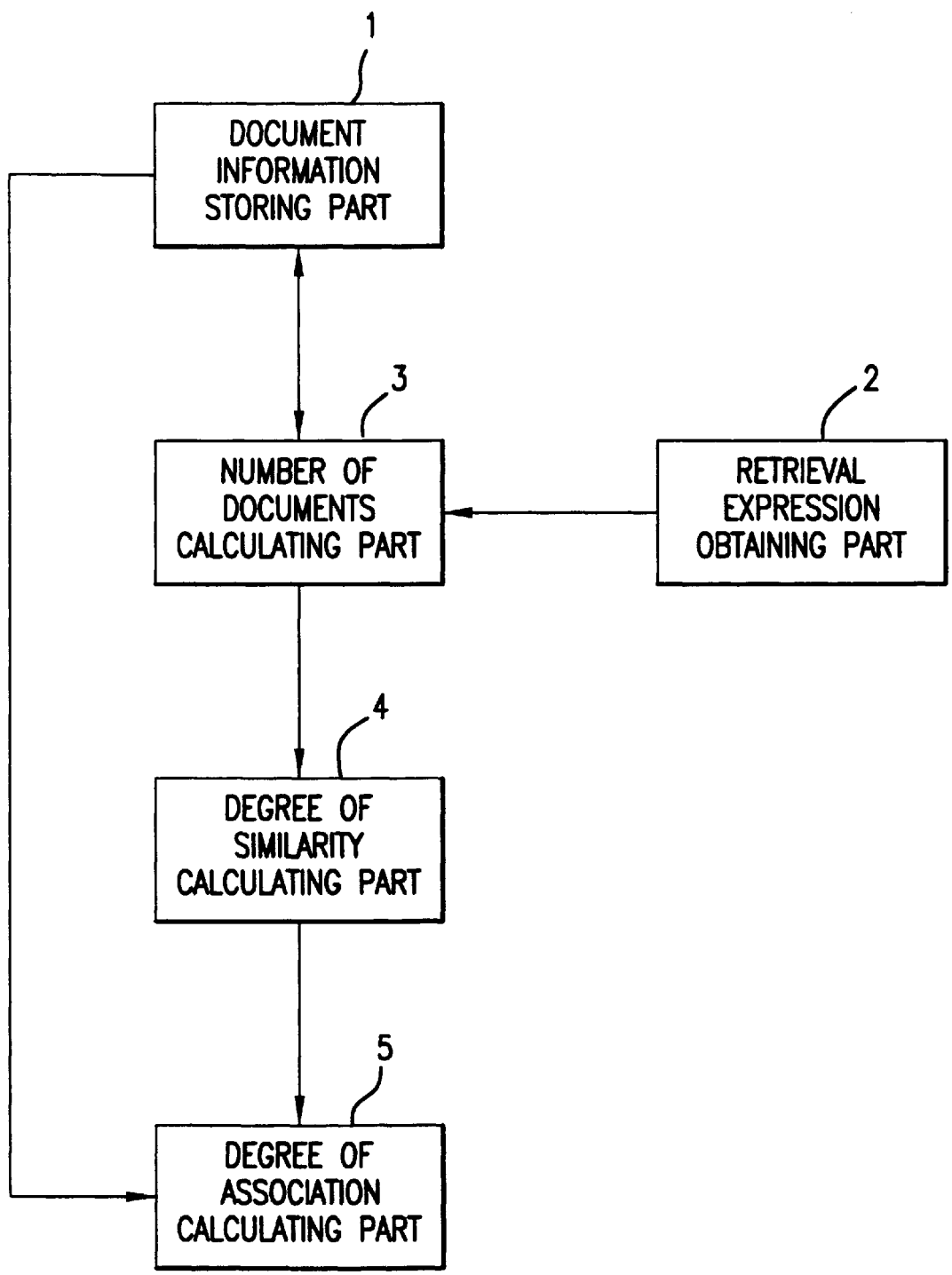
FIG. 1 shows the fundamental construction of the present invention.

FIG. 1 shows a fundamental construction of the present invention.

The document information storing part 1 of FIG. 1 associates each of the documents with keywords extracted from the document and stores them. The bibliographic items of each document can be included in the extracted keywords.

A retrieval expression obtaining part 2 receives a retrieval expression consisting of plural retrieval keywords connected by logical operators. In the retrieval expression, designated bibliographic items can be connected by the logical operators.

A number of documents calculating part 3 specifies objective keywords from which the degree of similarity will later be determined, from within the extracted keywords stored in the document information storing part 1. As the objective keywords, for example, the keywords extracted from the documents matching the retrieval expression are used. However, keywords arbitrarily inputted by a user may also be used as the objective keywords. The number of documents calculating part 3 also calculates a first number, a second number, a third number for each of the objective keywords and a fourth number for each of the objective keywords. The first number is the number of all the documents stored in the document information storing part 1. The second number is the number of documents, among the documents stored in the document information storing part 1, that match the retrieval expression received by the retrieval expression obtaining part 2. The third number for each of the objective keywords is the number of documents, among the documents stored in the document information storing part 1, containing each of the objective keywords that match the retrieval expression received by the retrieval expression obtaining part 2. The fourth number for each of the objective keywords is the number of documents, among the documents stored in the document information storing part 1, containing each of the objective keywords.

A degree of similarity calculating part 4 calculates the degree of similarity between the retrieval expression received by the retrieval expression obtaining part 2 and each of the objective keywords. This calculation is based on an equation having the first, second, third and fourth numbers as variables.

A degree of association calculating part 5 obtains associate document information about the documents containing each of the objective keywords as the extracted keyword, from the document information storing part 1, and calculates the degree of association between the retrieval expression and each of the documents stored in the document information storing part 1. The degree of association is based on the degree of similarity for each of the objective keywords obtained from the degree of similarity calculating part 4 and the associate document information.

According to the associate document retrieving apparatus as described above, when a user inputs a retrieval expression created by connecting retrieval keywords with logical operators, the retrieval expression is received by the retrieval expression obtaining part 2. Then the number of documents calculating part 3 calculates the first number, second number, third and fourth numbers for each of the objective keywords. The degree of similarity calculating part 4 calculates the degree of similarity between the retrieval expression received by the retrieval expression obtaining part 2 and each of the objective keywords. Finally, the degree of association calculating part 5 calculates the degree of association between the retrieval expression received by the retrieval expression obtaining part 2 and each of the documents stored in the document information storing part 1.

The degree of association calculated in this way resolves the two problems in the associate document retrieval of the conventional method for the following reasons.

The two problems of the conventional art are caused by calculation of the degree of association based on the degree of similarity of binary combinations of the keywords. In contrast, the present invention directly obtains the degree of similarity between the retrieval expression and each of the keywords and thereby it becomes possible to output the documents that are appropriate for the purpose behind the retrieval expression.

Furthermore, the present invention can calculate the degree of similarity between the retrieval expression and each of the keywords (including bibliographic items) even if the retrieval expression includes various types of bibliographic items. This is because the present invention directly obtains the degree of similarity between the retrieval expression and each of the keywords. Accordingly, it is possible to appropriately execute the associate document retrieval in accordance with the retrieval expression, including the bibliographic items.

The degree of similarity calculating part 4 of the present invention performs the calculation of the degree of similarity between a retrieval expression and a word by using mutual information, Dice-coefficient or t-score techniques. Examples of using mutual information, Dice-coefficient or t-score techniques for the calculation of the degree of similarity between words are described in "Bilingual Text Alignment Using Statistical and Dictionary Information", Haruno and Yamazaki, Information Processing Society of Japan, SIG Notes, 96-NL-112, pp. 23–30, 1996 and "Automated Formation of Bilingual Dictionary Using Statistical Information", Ohmori et al., Proceeding of the Second Annual Meeting of the Association for Natural Language Processing, pp. 49–52, 1996.

The method of extension for applying mutual information, or the like, to the present invention will now be explained.

The mutual information (MI) between the words, word1 and word2, is defined as follows:

$$MI(\text{word1}, \text{word2}) = \log_2\{\text{prob}(\text{word1}, \text{word2})/[\text{prob}(\text{word1})\text{prob}(\text{word2})]\} \quad (3).$$

As an example, it is assumed that the number of all the documents to be the object of retrieval is M, the number of documents containing both word1 and word2 is a, the number of documents containing only word1 is b and the number of documents containing only word2 is c. Using these assumptions, the following equations can be established:

$$\text{prob}(\text{word1}, \text{word2}) = a/M \quad (4);$$

$$\text{prob}(\text{word1}) = (a+b)/M \quad (5);$$

$$\text{prob}(\text{word2}) = (a+c)/M \quad (6).$$

The mutual information ($MI_0$) between the retrieval expression S and a word is defined as follows:

$$MI_0(S, \text{word}) = \log_2\{\text{prob}(S, \text{word})/[\text{prob}(S)\text{prob}(\text{word})]\} \quad (7).$$

In this case, it is assumed that the number of all the documents to be the object of retrieval is M, the number of documents containing "word" and obtained according to the retrieval expression S is $a_0$, the number of documents obtained according to the retrieval expression S and not containing "word" is $b_0$, and the number of documents containing "word" except the documents obtained according to the retrieval expression S is $c_0$. Using these values, the following equations can be established:

$$\text{prob}(S, \text{word}) = a_0/M \quad (8);$$

$$\text{prob}(S) = (a_0+b_0)/M \quad (9);$$

$$\text{prob}(\text{word}) = (a_0+c_0)/M \quad (10).$$

Here, "M" corresponds to "the first number", "$a_0+b_0$" corresponds to "the second number", "$a_0$" corresponds to "the third number" and "$a_0+c_0$" corresponds to "the fourth number." Therefore, equation (7) can be the equation that includes "the first number", "the second number", "the third number" and "the fourth number" as variables as follows:

$$MI_0(S, \text{word}) = \log_2\{Ma_0/[(a_0+b_0)(a_0+c_0)]\} \quad (11)$$

Dice-coefficient (DC) or t-score (TS) can also be used as the statistical value for obtaining the degree of similarity between the words. Each of them are defined as follows:

$$DC(\text{word1, word2}) = 2\text{prob}(\text{word1, word2})/[\text{prob}(\text{word1}) + \text{prob}(\text{word2})] \quad (12);$$

$$TS(\text{word 1, word2}) = M[\text{prob}(\text{word1,word2}) - \text{prob}(\text{word 1})\text{prob}(\text{word2})]/[\text{prob}(\text{word1})\text{prob}(\text{word2})] \quad (13).$$

Similar to the mutual information, it is possible to apply the following extension to the Dice-coefficient and t-score for calculating the degree of similarity between the retrieval expression and the word:

$$DC_0(S, \text{word}) = 2\text{prob}(S, \text{word})/[\text{prob}(S) + \text{prob}(\text{word})] \quad (14);$$

$$TS_0(S, \text{word}) = M[\text{prob}(S, \text{word}) - \text{prob}(S)\text{prob}(\text{word})]/[\text{prob}(S)\text{prob}(\text{word})] \quad (15).$$

When using any of $MI_0(S, \text{word})$, $DC_0(S, \text{word})$ and $TS_0(S, \text{word})$, the degree of similarity between the retrieval expression S and the word becomes higher as the value of $MI_0(S, \text{word})$, $DC_0(S, \text{word})$ or $TS_0(S, \text{word})$ becomes larger. Hereinafter, $MI_0(S, \text{word})$, $DC_0(S, \text{word})$ and $TS_0(S, \text{word})$ are referred to as "extended mutual information", "extended DC" and "extended TS", respectively. Similar to the extended mutual information, the extended DC and extended TS can be represented as follows:

$$DC_0(S, \text{word}) = 2a_0/[(a_0+b_0)+(a_0+c_0)] \quad (16);$$

$$TS_0(S, \text{word}) = M[Ma_0 - (a_0+b_0)(a_0+c_0)]/[(a_0+b_0)(a_0+c_0)] \quad (17).$$

As it can be seen from equation (16), the number of all the documents to be the object of retrieval M is unnecessary for obtaining the extended DC.

Now, consider a case where a user is looking for the documents about means of transportation for traveling abroad from Japan. In this case, the user inputs keywords representing means of transportation as a retrieval expression. A retrieval expression such as "(airplane) or (aircraft) or (passenger plane) or (ship)" may be given if it happens that most of the keywords the user brings to his/her mind are related to the airplane. It is desirable to include as many keywords as possible in the retrieval expression to retrieve the associate documents from a wide range of documents. Therefore, in this case, the similar words of "airplane" should not be excluded from the retrieval expression even though the similar words of "ship" cannot be thought of.

Figure 2A:
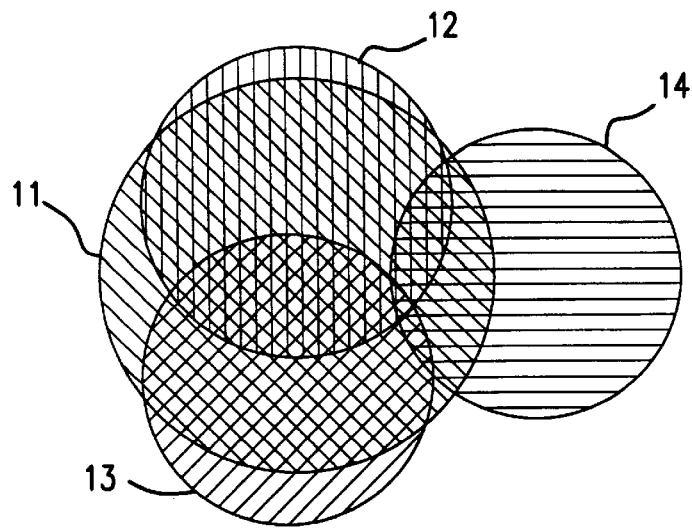
FIGS. 2(A) and 2(B) are conceptual views showing the difference in calculation of the degree of association between a conventional method and the present invention (FIG. 2(A) shows a result of the associate document retrieval according to the conventional method and FIG. 2(B) shows a result of the associate document retrieval according to the present invention)
Figure 2B:
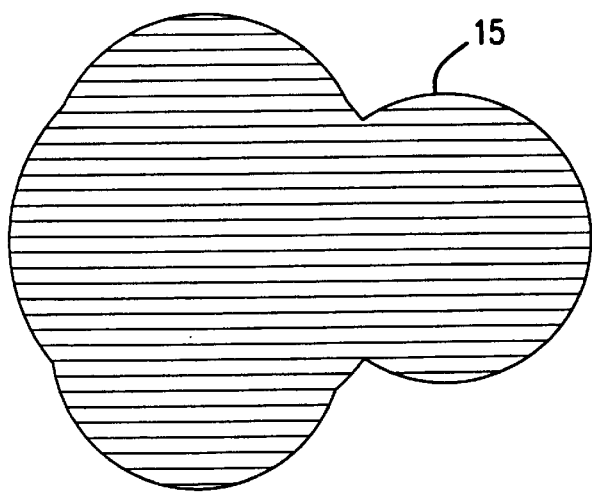

Next, the difference in the calculation of the degree of association between the associate document retrieval in the above case, according to the present invention and the associate document retrieval according to the conventional methods, will be described. FIGS. 2(A) and 2(B) are conceptual views showing the difference in the calculation of the degree of association between the conventional method and the present invention. FIG. 2(A) shows the result of the associate document retrieval according to the conventional method and FIG. 2(B) shows the result of the associate document retrieval according to the present invention.

In the associate document retrieval of the conventional method, the documents containing each of the keywords "airplane", "aircraft", "passenger plane" and "ship" (or, documents containing the similar words of each keyword obtained by the equation (3) or the like based on the documents containing each keyword) are separately obtained, and then the algebraic calculation of the degree of association by sum operation is executed. As a result, as shown in FIG. 2(A), each of the set of documents 11 containing "airplane", the set of documents 12 containing "aircraft", the set of documents 13 containing "passenger plane" and the set of document 14 containing "ship" has redundant portions. In the redundant portion, the sum of the values of degree of association obtained for each keyword is regarded as the degree of association between the documents included in the redundant portion and the retrieval expression. However, "airplane", "aircraft" and "passenger plane" have relatively large redundant portions and, accordingly, it is determined that the documents related to "airplane" have a higher degree of association. Therefore, the value of the degree of association is determined depending on the size of redundant portions of the sets, each of which corresponds to each keyword regardless of the primary purpose of creating the retrieval expression.

In contrast, in the associate document retrieving apparatus of the present invention, the similar words are directly obtained from the set of documents 15 which the retrieval expression exactly means. Thereby, appropriate associate documents can be obtained from the set of the documents properly matching the purpose of the retrieval expression. In other words, though most of the inputted keywords are related to airplane, the result of retrieval is not partial to the documents related to airplane.

Moreover, in the associate document retrieving apparatus according to the present invention, it becomes possible to include the various types of designated bibliographic items in the retrieval expression in the same manner as the keywords. For example, even if a retrieval expression including bibliographic items such as the date of publication or the name of the author is inputted, appropriate associate document retrieval can be executed. It is also possible to directly specify a document identifier as a bibliographic item. For example, it is assumed that the associate document retrieval is executed and, as a result, the document is determined to be suitable for the purpose of retrieval. Then the identifier of the document can be specified as the bibliographic item in the retrieval expression used in the next associate document retrieval, whereby more precise associate document retrieval is available.

First Embodiment

Figure 3:
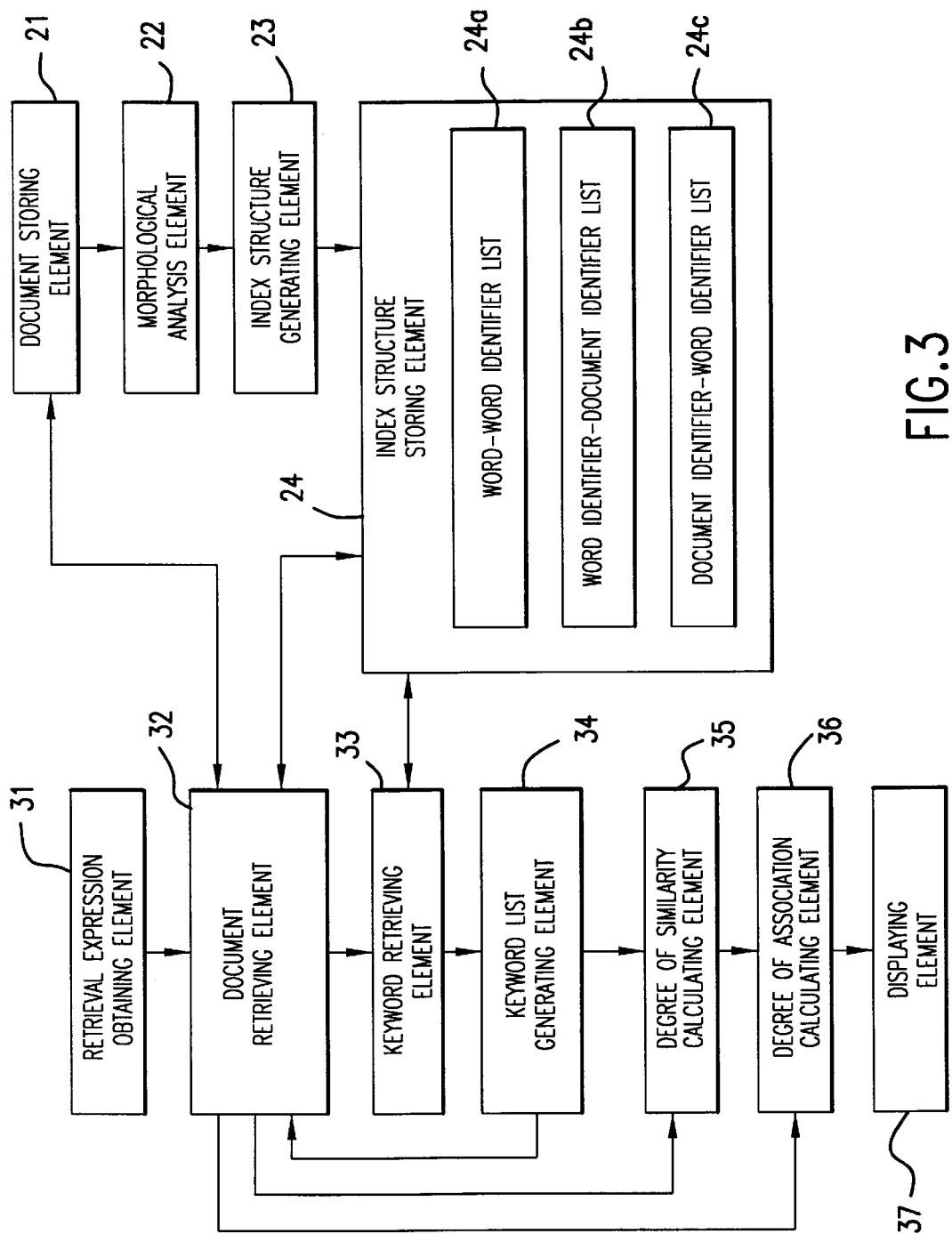
FIG. 3 is a block diagram showing the construction of an embodiment of the present invention.

FIG. 3 is a block diagram showing a construction of an embodiment of the associate document retrieving apparatus of the present invention. The function held by each element, described as follows, is implemented by a computer executing predetermined program modules. A computer program for implementing the program modules is stored in a storage medium such as a semiconductor memory or a magnetic storage medium.

A document storing element 21 is a storing device which pairs the content of an electronic document to be the object of retrieval and bibliographic items added to the document with a document identifier added by a morphological analysis element 22 and stores the pair.

The morphological analysis element 22 adds the document identifier to each of the documents stored in the document storing element 21 and then, (1) applies the morphological analysis to each document to extract independent words (words to be the keywords), (2) makes pairs of the extracted word and the document identifier, and (3) stores them. If the bibliographic items are added to each document, each of them is paired with the document identifier the same as the independent word and stored.

An index structure generating element 23 generates a word-word identifier list 24a, a word identifier-document identifier list 24b and a document identifier-word identifier list 24c, as index structures based on the result of the morphological analysis by the morphological analysis element 22.

The word-word identifier list 24a describes the correspondence between the character string of a word or a bibliographic item and a word identifier for identifying it.

The document identifier-word identifier list 24b describes a set of document identifiers of the documents containing a character string of a word or a bibliographic item identified by a word identifier, for each of the word identifiers.

The document identifier-word identifier list 24c describes a set of word identifiers of the words contained in a document identified by a document identifier or word identifiers of the bibliographic items added to a document identified by the document identifier, for each of the document identifiers.

An index structure storing element 24 is a storage device for storing the word-word identifier list 24a, the word identifier-document identifier list 24b and the document identifier-word identifier list 24c generated by the index structure generating element 23.

A retrieval expression obtaining element 31 is a user interface capable of inputting a retrieval expression. The retrieval expression is created by connecting keywords or designated bibliographic items by logical operators, such as "and", "or", or "not", as a condition for obtaining associate documents.

A document retrieving element 32 receives a retrieval expression inputted to the retrieval expression obtaining element 31 and word identifiers in a keyword list generated by a keyword list generating element 34 (described later). The document retrieving element obtains document identifiers of the documents matching the inputted retrieval expression or the documents containing the words identified by the received word identifiers with reference to the word-word identifier list 24a and the word identifier-document identifier list 24b.

A keyword retrieving element 33 obtains a set of word identifiers of the words contained in each of the documents in the set of documents identified by the set of document identifiers obtained by the document retrieving element 32, with reference to the document identifier-word identifier list 24c, and concatenates them to be a single set of word identifiers.

The keyword list generating element 34 counts the number of times of appearance of each of the word identifiers among the set of word identifiers obtained by the keyword retrieving element 33. Based on the counted number of times of appearance and a total number of the document identifiers obtained by the document retrieving element 32, the keyword list generating element 34 generates a list of the word identifiers, an appearance probability of documents containing the words corresponding to the word identifiers and an appearance probability of documents matching the retrieval expression and containing the words corresponding to the word identifiers.

A degree of similarity calculating element 35 calculates the extended mutual information of the words corresponding to each word identifier in accordance with equation (7) with reference to the list generated by the keyword list generating element 34.

A degree of association calculating element 36 calculates the degree of association between the retrieval expression and each of the documents stored in the document storing element 21 based on the extended mutual information of each word calculated by the degree of similarity calculating element 35.

A displaying element 37 is a user interface for outputting pieces of document information corresponding to the documents arranged in descending order of degree of association calculated by the degree of association calculating element 36.

The document storing element 21 and the index structure storing element 24 in FIG. 3 correspond to the document information storing part 1 in FIG. 1; the retrieval expression obtaining element 31 in FIG. 3 corresponds to the retrieval expression obtaining part 2 in FIG. 1; the document retrieving element 32, keyword retrieving element 33 and keyword list generating element 34 in FIG. 3 correspond to the number of documents calculating part 3 in FIG. 1; the degree of similarity calculating element 35 in FIG. 3 corresponds to the degree of similarity calculating part 4 in FIG. 1; and the degree of association calculating element 36 in FIG. 3 corresponds to the degree of association calculating part 5 in FIG. 1.

In this embodiment, it is necessary to generate the index structures in advance of execution of the associate document retrieval. Therefore, the process of generation of the index structure is explained first. As a prerequisite to generation of the index structure, a list of the results of the morphological analysis must have been generated.

FIG. 4 shows an example list of the results of the morphological analysis 41 stored in the morphological analysis element 22. The morphological analysis element 22 assigns an identifier to each of the documents stored in the document storing element 21, executes the morphological analysis process on each document and extracts the independent words, and pairs each of the extracted words with the corresponding document identifier and stores the pair. However, if the same independent word is extracted multiple times from the same document, the second and subsequent results of extraction are ignored so that there is no redundancy of an independent word corresponding to a single document identifier. In the case where bibliographic items are added to the document, each of the bibliographic items is paired with the corresponding document identifier in the same manner as the independent word, together with a tag indicating the type of bibliographic item, and then stored. In the example shown in FIG. 4, "<DATE>" and "<AUTH>" are tags indicating the date of creation (publication) of the document and the author, respectively.

Based on the list of the results of the morphological analysis 41, the index structure generating element 23 generates the various types of index structures. FIGS. 5 through 7 show examples of index structures generated by the index structure generating element 23 and stored in the index structure storing element 24. The pieces of data shown in FIGS. 5 through 7 are generated based on the data shown in FIG. 4.

FIG. 5 shows an example of the word-word identifier list 24a. In this list, the extracted word or bibliographic item and an identifier assigned to the word or the tagged bibliographic item are paired and stored. In the example, "word identifier" includes the identifier assigned to the tagged bibliographic item.

FIG. 6 shows an example of the word identifier-document identifier list 24b. In this list, the word identifier and the document identifier of the document containing the word to which the word identifier is assigned are paired and stored.

FIG. 7 shows an example of the document identifier-word identifier list 24c. In this list, the document identifier and the word identifiers of the words contained in the document to which the document identifier is assigned are paired and stored.

Figure 8:
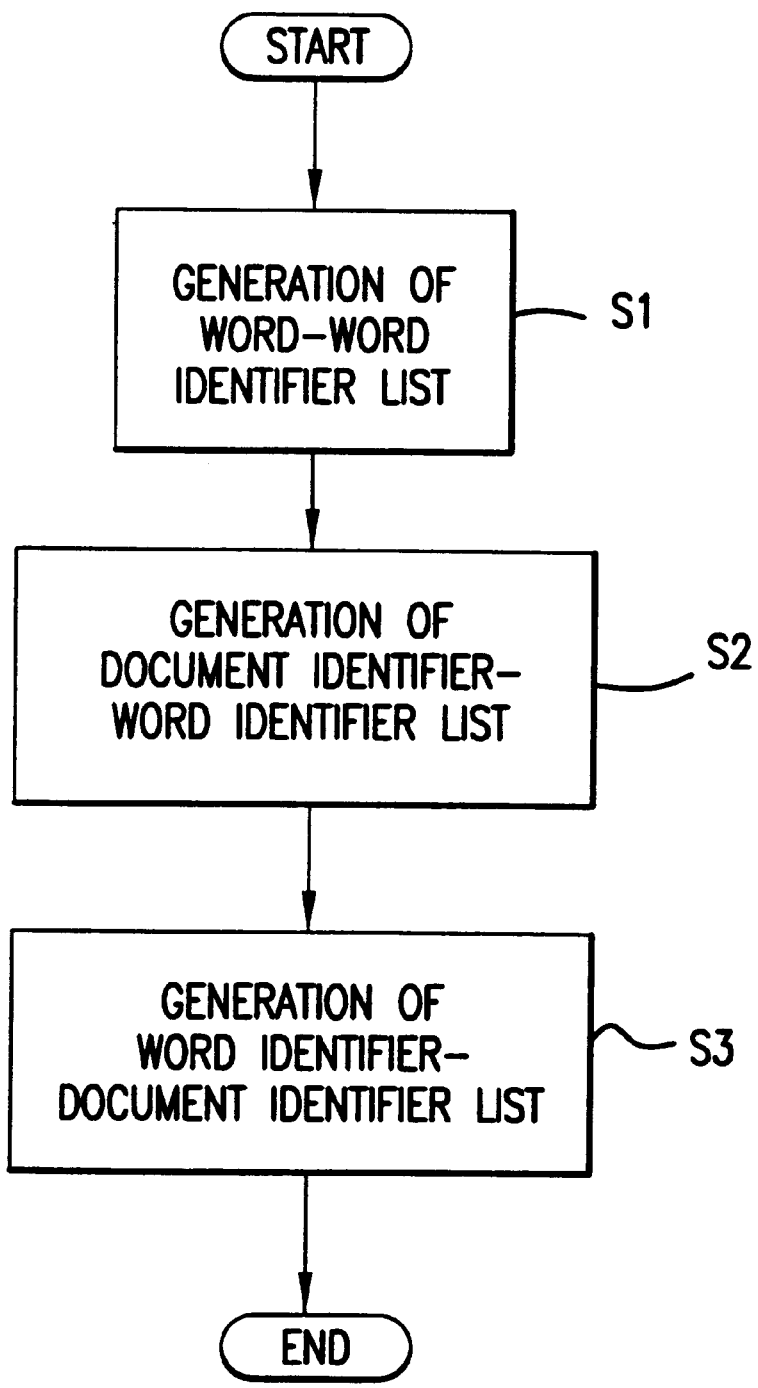
FIG. 8 is a flow chart showing an algorithm for generating an index structure.

FIG. 8 is a flow chart showing an algorithm for generating the index structure according to the present invention.

In step S1, the process of generating the word-word identifier 24a is executed. Specifically, a list of all words and tagged bibliographic items in the list of the results of the morphological analysis stored in the morphological analysis element 22 is generated so that there is no redundancy in the words and the bibliographic items and they are sorted in the order of the values of text codes of their character strings. Natural numbers starting from 1 are assigned as the word identifiers to the words from the top of the list.

Then, in step S2, the process of generating the document identifier-word identifier list 24c is executed. Specifically, all the words and tagged bibliographic items in the list of the results of the morphological analysis stored in the morphological analysis element 22 are replaced with the word identifiers assigned in step S1 and the word identifiers are sorted in ascending order for each of the document identifiers.

Next, in step S3, the process of generating the word identifier-document identifier list 24b is executed. Specifically, the word identifiers are arranged in descending order and the document identifiers of the documents containing the words corresponding to respective word identifiers are extracted with reference to the document identifier-word identifier list 24c. Each of them is paired with the corresponding word identifiers and stored.

According to the above algorithm, the index structures are generated. After the process of generation of the index structures is executed, the retrieval expression obtaining element 31 accepts the input of the retrieval expression. The process of associate document retrieval is started when the user inputs a desirable retrieval expression using an inputting device, such as a keyboard, and gives a direction to start retrieval.

Figure 9:
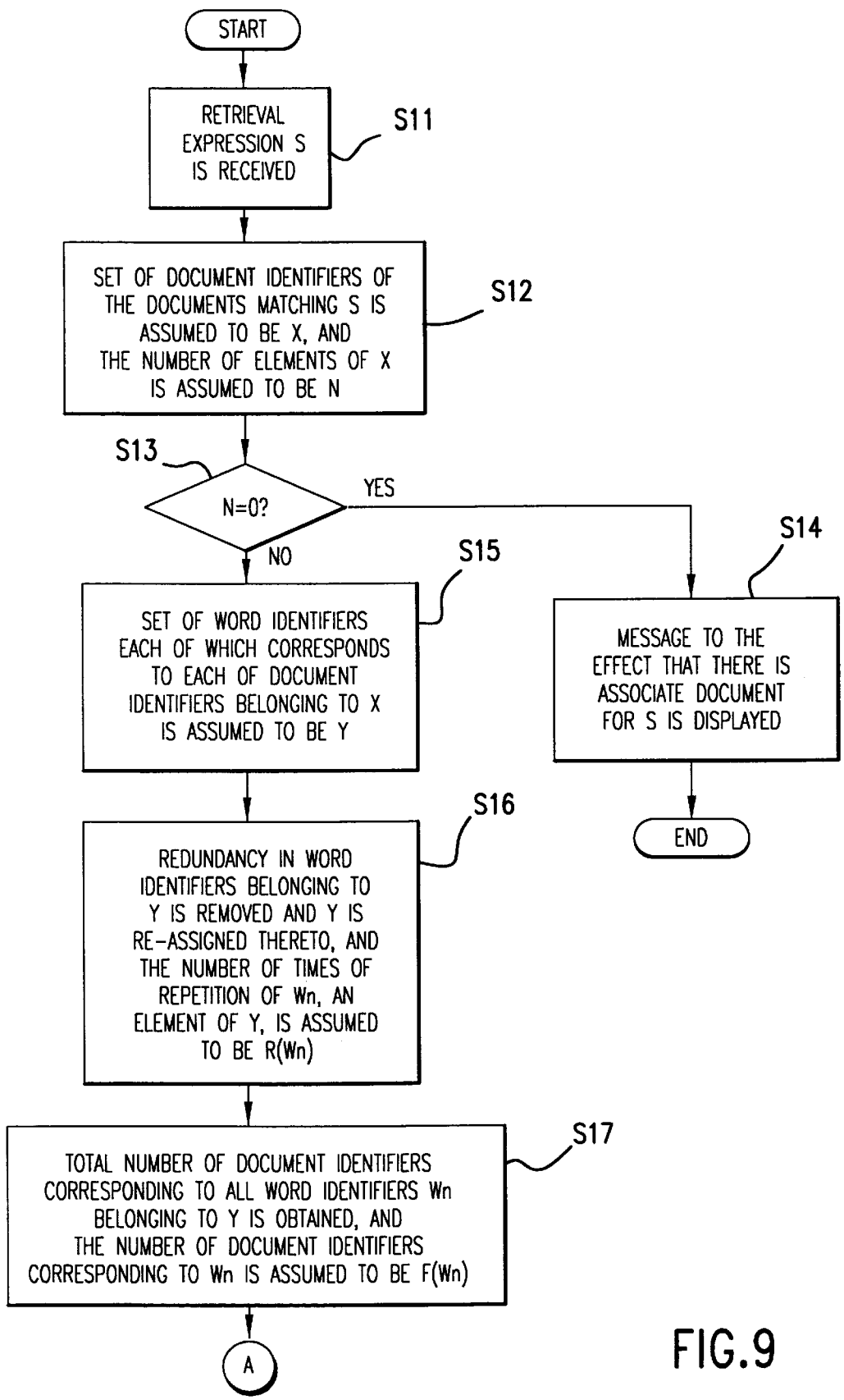
FIGS. 9 and 10 are flow charts showing procedures in processes of the present invention.
Figure 10:
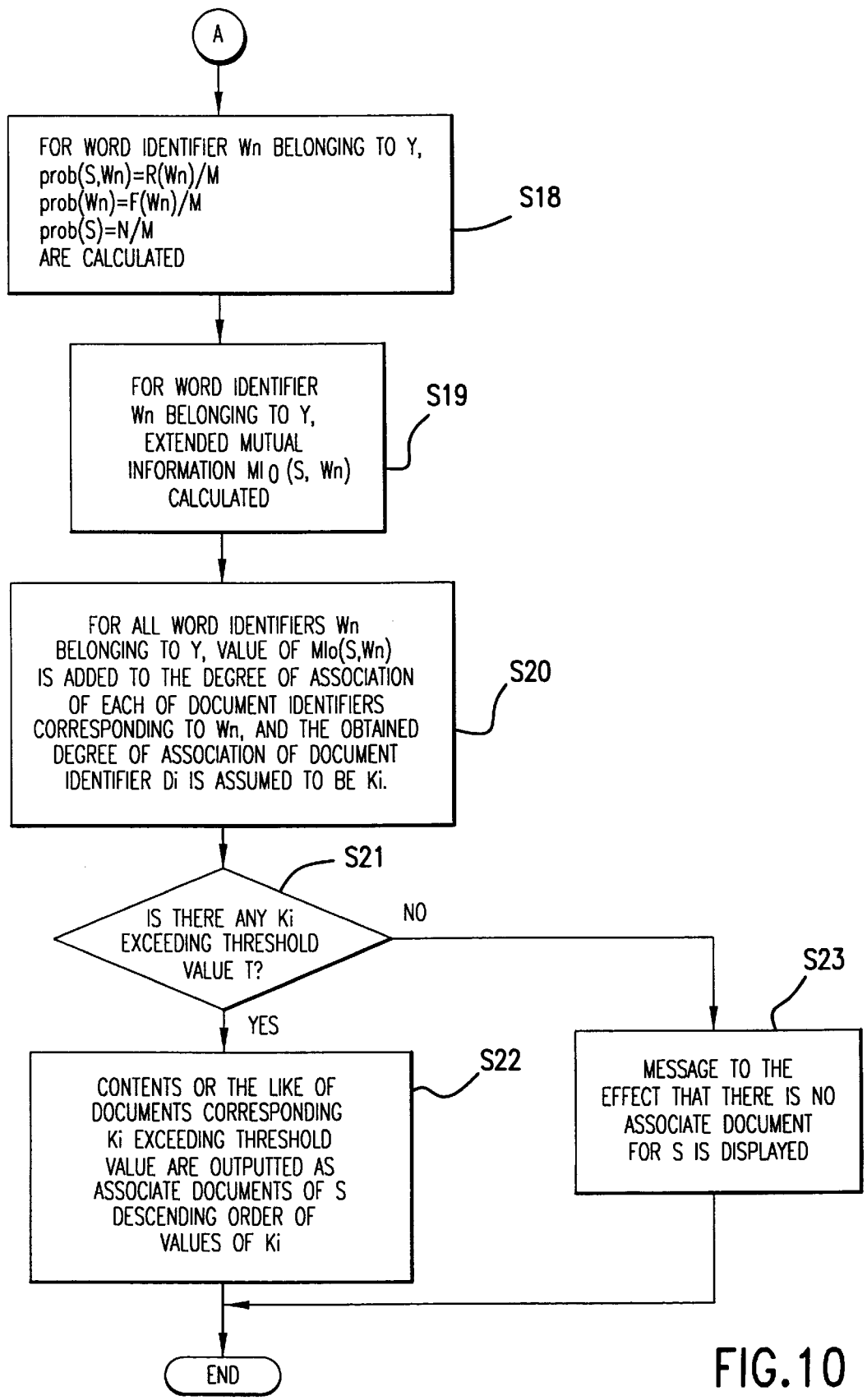

FIGS. 9 and 10 are flow charts showing an algorithm for obtaining the associate documents in accordance with the retrieval expression inputted to the retrieval expression obtaining element 31. Steps shown in FIGS. 9 and 10 are explained as follows. In the explanation, the word-word identifier list 24a, the word identifier-document identifier list 24b and the document identifier-word identifier list 24c are referred to as L1, L2 and L3, respectively, for simplification.

In step S11, the retrieval expression obtaining element 31 receives a retrieval expression consisting of keywords and/ or designated bibliographic items connected by logical operators. The retrieval expression is referred to as S.

Then, in step S12, the document retrieving element 32 obtains document identifiers of the documents matching S with reference to L1 and L2. It is assumed that the set of the obtained document identifiers is referred to as X, and the number of the elements of the set X is indicated by N.

Next, in step S13, if N=0 in step S12, the process proceeds to step S14. Otherwise, the process proceeds to step S15.

In step S14, the displaying element 37 displays a message to the effect that there is no associate document for S and the process is completed.

In step S15, the keyword retrieving element 33 obtains word identifiers corresponding to each of the document identifiers belonging to X with reference to L3 and the set of the obtained word identifiers is assumed to be Y.

Next, in step S16, the keyword list generating element 34 removes redundancy in word identifiers belonging to Y and records the number of times of repetition of each word identifier. The reference alphabet Y is re-assigned to the set of word identifiers from which the redundancy has been removed. It is assumed that each of the word identifiers belonging to Y is Wn (n=1, 2, ..., P) and the number of times of repetition of Wn is R (Wn). Here, P is the number of elements belonging to Y.

Then, in step S17, the document retrieving element 32 obtains the total number of document identifiers corresponding to all word identifiers belonging to Y, namely, Wn (n=1, 2, ..., P) from L2. The number of documents corresponding to Wn is assumed to be F (Wn).

Next, in step S18, provided that the number of all documents which are the objects of retrieval is M, the keyword list generating element 34 executes the following calculations for Wn (n=1, 2, ..., P):

$$\text{prob}(S, Wn) = R(Wn)/M \tag{18}$$

$$\text{prob}(Wn) = F(Wn)/M \tag{19}$$

The keyword list generating element 34 pairs each of these values with Wn to be included in a list. The following equation:

$$\text{prob}(S) = N/M \tag{20}$$

is also calculated.

In step S19, the degree of similarity calculating element 35 calculates the extended mutual information $MI_0$ (S, Wn) for each of the word identifier belonging to Y, Wn (n=1, 2, ..., P) according to equation (7).

Then, in step S20, premising that the initial values of the degree of association corresponding to all document identifiers are 0, the degree of association calculating element 36 adds the values of $MI_0$ (S, Wn) calculated in step S19 to the values of the degree of association for each of the document identifiers corresponding to all of the word identifiers belonging to Y, namely, Wn (n=1, 2, ..., P). The degree of association of the document identifier Di (i=1, 2, ..., M) is assumed to be Ki.

Next, in step S21, if there is any Ki exceeding a predetermined threshold value T, the process proceeds to step S22. Otherwise, the process proceeds to step S23.

In step S22, the displaying element 37 outputs the contents or document information such as a title of each of the documents corresponding to Ki exceeding the threshold value T as the associate documents of S in descending order of the values of Ki.

In step S23, the displaying element 37 displays a message to the effect that there is no associate document of S and the process is completed.

According to the above steps, it becomes possible to directly obtain the similar words from the retrieval expression, including the bibliographic items, and retrieve the associate documents matching the purpose behind the retrieval expression. That is, the result of retrieval is not biased by the number of the similar words inputted as the retrieval keywords.

As described in "Symbolic Logic", Y. Shimizu, Tokyo University Press, 1984, pp. 34–36, equivalent transformation of an arbitrary retrieval expression (logical expression) into a conjunctive normal form is possible by applying the second distributive law "(A or (B and C))=((A or B) and (A or C))" repeatedly. The retrieval expression of the conjunctive normal form is a retrieval expression in which keywords are connected by the logical operator "or" (namely, disjunctive clauses) are further connected by "and". For example, "((airplane)) or (aircraft) or (passenger plane)) and ((car) or (automobile)) and ((ship) or (vessel) or (boat))" is a conjunctive normal form and each of "(airplane) or (aircraft) or (passenger plane)", "(car) or (automobile)" and "(ship) or (vessel) or (boat)" is a disjunctive clause.

Therefore, it is possible to transform the inputted retrieval expression into that of the conjunctive normal form in the retrieval expression obtaining element 31 and execute the associate document retrieval using the retrieval expression in the conjunctive normal form. The procedures in the process of transforming the retrieval expression into that of the conjunctive normal form are explained as follows.

Figure 11:
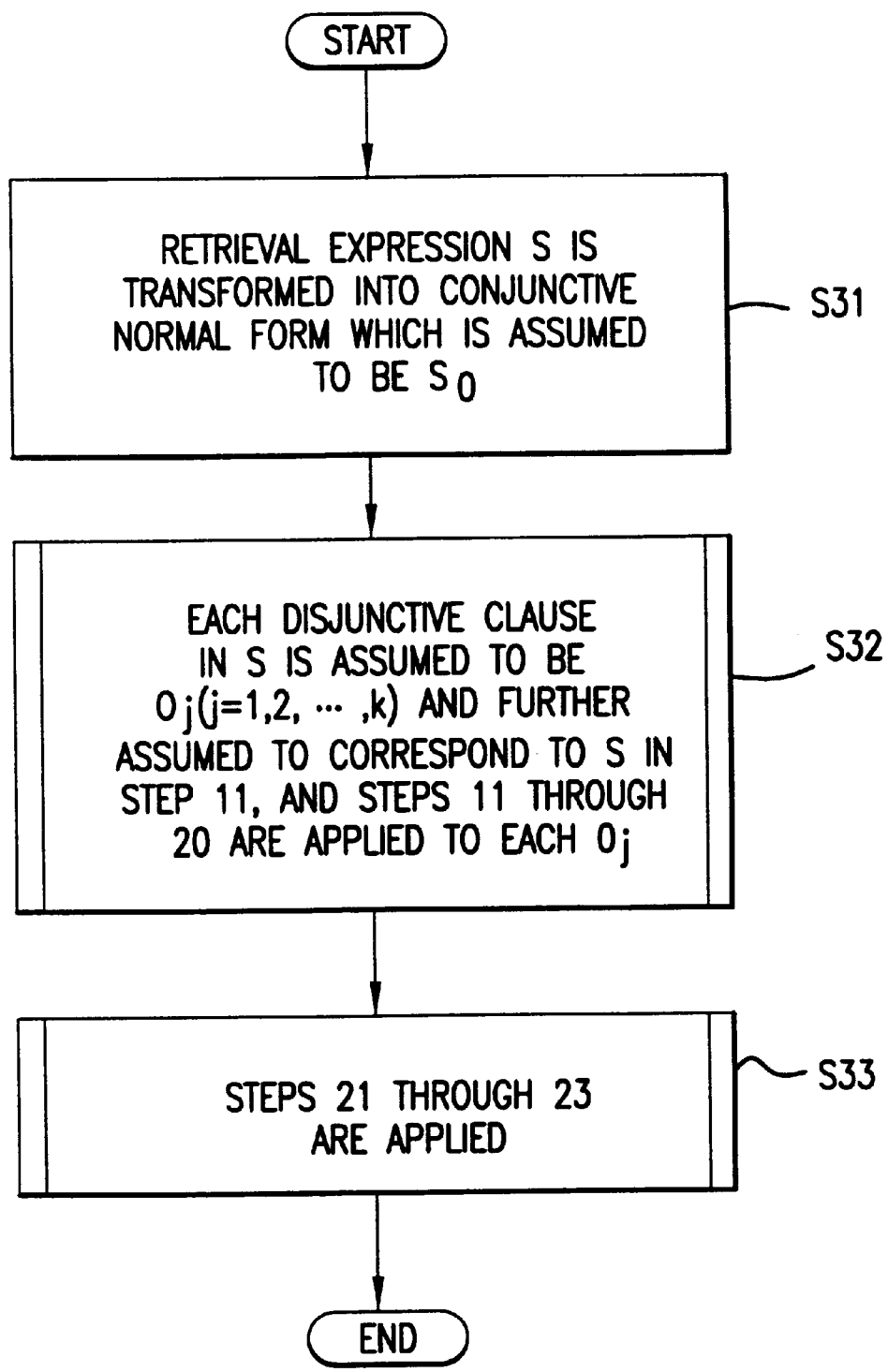
FIG. 11 is a flow chart showing a retrieving algorithm in the case where an inputted retrieval expression is transformed into that of the conjunctive normal form.

FIG. 11 shows a flow chart showing a retrieval algorithm in the case where an inputted retrieval expression is transformed into that of the conjunctive normal form.

In step S31, the retrieval expression obtaining element 31 transforms an inputted retrieval expression S into the conjunctive normal form and assumes that the obtained retrieval expression of the conjunctive normal form is $S_0$.

Then, in step S32, on the assumption that each of the disjunctive clauses in $S_0$ is Oj (j=1, 2, . . . , k) and Oj corresponds to S in step S11, the steps S11 through S20 in FIGS. 9 and 10 are applied to each Oj. However, it is determined that the initial values of the degree of association corresponding to all the document identifiers are made to be 0 only when the step S20 is applied at first, and that the value of Ki obtained in the preceding process is regarded as the initial value from the second and subsequent times (to the k times).

Then, in step S33, the steps S21 through S23 in FIG. 10 are applied.

According to the above algorithm, the inputted retrieval expression can be transformed into the conjunctive normal form and the associate document retrieval can be executed.

In general, similar words over a wide range are available from a retrieval expression wherein the keywords are connected only by "or", namely, a disjunctive clause. Therefore, according to the algorithm shown in FIG. 11, the associate documents over a wider range are available compared with the result of the associate document retrieval obtained by the process shown in FIGS. 9 and 10.

The algorithm shown in FIG. 11 directly executes similar word calculation within each of the disjunctive clauses and obtains the degree of association between the retrieval expression and each of the documents by associating only the logical operator "and" with the algebraic summation. Consequently, there is no difficulty in representing the general relationship of keywords, connected by the logical operators, by the algebraic calculation. Moreover, the algorithm does not limit the generality in description of the retrieval expression.

As described above, according to the present invention, it is possible to retrieve the associate documents appropriately matching the retrieval expression created by connecting the keywords with logical operators. This is possible because of the direct calculation of similar words from the retrieval expression. Furthermore, even in the case where bibliographic items are included in the retrieval expression, the associate document retrieval is available. Therefore, when the user inputs a retrieval expression created to be used in a retrieval system of the complete-match type to the associate document retrieving apparatus of the present invention, the associate documents which are by no means obtained by the complete-match retrieval can be appropriately obtained with the present invention.

To verify the effect of the present invention, the associate document retrieval is executed on 116,000 cases of Japanese Patent Application Laid-Open Publications as the objects of retrieval with the construction of the embodiment according to the present invention. The objects of morphological analysis by the morphological analysis element 22 are "title of the invention" and the sentences included in "summary (various bibliographic items and main parts of the specification extracted)". The bibliographic items include the symbol of the international patent classification (IPC), the name of the applicant, or the like. Further, to compare the results, the associate document retrieval according to the conventional method is also executed.

FIGS. 12(A) and 12(B) show the results of associate document retrieval in accordance with the retrieval expression "(bath) or (bath furnace) or (bathtub) or (hot-water supply) or (toilet)". FIG. 12(A) shows the result of retrieval according to the present invention and FIG. 12(B) shows the result of retrieval according to the conventional method. Each figure shows the "title of the invention" of the highest ranked 20 patent applications outputted in descending order of the degree of association between each of the applications and the retrieval expression, except for the patent applications completely matching with the inputted retrieval expression.

Independent of the retrieval in accordance with the above retrieval expression, the complete-match retrievals (full text retrievals) are executed in accordance with the retrieval expressions "(bath) or (bath furnace) or (bathtub) or (hot-water supply)" and "toilet". As a result, 148 applications and 132 applications are obtained for the retrieval expressions "(bath) or (bath furnace) or (bathtub) or (hot-water supply)" and "toilet", respectively. Consequently, it is desirable for approximately the same number of applications to be obtained as a result of the associate document retrieval.

Returning to the results shown in FIGS. 12(A) and 12(B), it can be seen that the patent applications related to "bath" and "toilet" are retrieved in good balance by the associate document retrieving apparatus according to the present invention. In contrast, in the result of the conventional associate document retrieval, most of the retrieved patent applications are related to "bath" for which several synonyms (similar words) were given.

As another example, the associate document retrieval is executed in accordance with a symbol of the international patent classification (IPC) designated as the bibliographic item. IPC classifies the fields of technologies of inventions related to patent applications. Therefore, appropriate result of retrieval can be expected by execution of retrieval based on the symbol of IPC designated as the bibliographic item.

FIGS. 13(A) and 13(B) show the results of associate document retrieval in accordance with the retrieval expression "(<ipc>A61H) and (magnetism)". FIG. 13(A) shows the result of retrieval according to the present invention and FIG. 13(B) shows the result of retrieval according to the conventional method. Each figure shows the "title of the invention" of the highest ranked 20 patent applications outputted in descending order of values of the degree of association between each of the applications and the retrieval expression, except for the patent applications completely matching with the inputted retrieval expression. Here, "A61H" is a subclass symbol of IPC related to "physical treatment apparatus". That is, patent applications related to "physical treatment apparatus" using "magnetism" are to be retrieved here.

As it can be understood from FIG. 13(A), according to the associate document retrieving apparatus, patent applications related to "physical treatment apparatus" using "magnetism" are appropriately retrieved from the patent applications belonging to IPC other than "A61H". In contrast, in the associate document retrieval according to the conventional method, information about IPC is not considered and the associate documents are retrieved only based on the keyword "magnetism". Therefore, patent applications completely irrelevant to "physical treatment apparatus" are detected as the results of retrieval. Therefore, it is impossible to obtain an appropriate result using the conventional method. Even if the patent applications belonging to IPC "A61H" are extracted from the result obtained by the associate document retrieval according to the conventional method, the associate patent applications belonging to an IPC other than "A61H" are unavailable. They are only available by the associate document retrieving apparatus according to the present invention.

Next, the result of comparison of the precision and recall between the present invention and other methods is examined. FIG. 14 shows the result of retrieval in accordance with a retrieval expression "(<ipc>G06F) and ((associate word) or (similar word) or (thesaurus) or (statistical value))". In FIG. 14, results of retrieval by the following three methods are compared:

(1) complete-match retrieval (full text retrieval);
(2) associate document retrieval by the associate document retrieving apparatus according to the present invention; and
(3) associate document retrieval according to the conventional method (incapable of including the bibliographic items in the retrieval expression)

In the associate document retrievals according to the present invention and the conventional method, the patent applications detected by the complete-match retrieval are excluded and then 30 patent applications of higher ranks in descending order of degree of association between each application and the above retrieval expression are regarded as the result of retrieval.

As mentioned above, in the associate document retrieval according to the conventional method, it is impossible to include the designated bibliographic items in the retrieval expression. Therefore, associate document retrieval according to the conventional method is executed in accordance with the retrieval expression created by excluding designation of IPC "<ipc>G06F" which is the bibliographic item, namely, "(associate word) or (similar word) or (thesaurus) or (statistical value)".

The precision and the recall shown in FIG. 14 are values representing the quality of the result of retrieval. The precision is the ratio of the number of the relevant documents in a result of retrieval ("the number of relevant patent applications" in the figure) to the number of documents obtained as the result of retrieval ("the number of hits" in the figure). The recall is the ratio of the number of the relevant documents in the result of retrieval ("the number of relevant patent applications" in the figure) to the number of the relevant documents in all the documents which are the object of retrieval.

The average precision of the complete-match retrieval, the associate document retrieval according to the present invention, and the associate document retrieval according to the conventional method are 10.6%, 13.3% and 3.3%, respectively. When the average precision and the average recall of the complete-match retrieval is normalized (assumed to be 1), the average precision and the average recall of the associate document retrieval according to the present invention are 1.25 and 2.35, respectively. In contrast, the average precision and the average recall of the associate document retrieval according to the conventional method are 0.31 and 0.59, respectively. Consequently, the precision and the recall of the result of the associate document retrieval according to the present invention are higher than those of the complete-match retrieval and the associate document retrieval according to the conventional method. Therefore, it can be said that more appropriate result of retrieval is available according to the present invention.

If the calculation of the degree of similarity between the retrieval expression and each keyword is executed in advance, it is unnecessary to execute the calculation after the retrieval expression is inputted. Thereby, associate document retrieval with high speed may be realized. However, the associate document retrieving apparatus of the present invention is constructed so that the degree of similarity is calculated after the retrieval expression is inputted because it is difficult to realize the calculation of the degree of similarity before inputting the retrieval expression from the viewpoint of the amount of calculations necessary.

Here, the calculation amount and the calculation time required for calculating the degree of similarity between the retrieval expression and each of the keywords in advance are considered.

In the case where the retrieval is applied to 116,000 Japanese patent application laid-open publications, the number of the words extracted by the morphological analysis element 22 and stored in the index structure storing element 24 is about 200,000. Therefore, if it is assumed that only the number of retrieval expressions created by connecting two words by "or" is calculated, the total number may be $_{200,000}C_2 \approx 20,000,000,000$. The calculation time required for calculating the degree of similarity between one retrieval expression and each of the keywords is about 10 seconds on average on a workstation level. Even if it is assumed to be 1 second, the time required for calculating the degree of similarity for 20,000,000,000 types of retrieval expressions is 20,000,000,000 seconds, namely, about 634 years. Besides, if the retrieval expressions including the bibliographic items or the like are taken into consideration, an enormous calculation time is required. Consequently, it is difficult to execute the calculation in advance.

As mentioned above, in the associate document retrieving apparatus according to the present invention, the degree of similarity between the retrieval expression and each of the keywords are directly obtained. Therefore, the result of retrieval appropriately reflecting the relation of keywords in the retrieval expression connected by logical expressions can be obtained. As a result, associate document retrieval suited to the purposes of the user can be appropriately executed.

Furthermore, the associate document retrieving program according to the present invention may be stored on a storage medium. Therefore, by having a computer execute the associate document retrieving program, it becomes possible to construct a computer having several functions for directly obtaining the degree of similarity between the retrieval expression and each of the keywords.

The foregoing description of preferred embodiment of the invention has been presented for purposes of illustration and description. It is not intended to be exhaustive or to limit the invention to the precise form disclosed. Modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An associate document retrieving apparatus that retrieves a document related to an inputted retrieval condition, comprising:

a document information storing element that associates each of a plurality of documents with a keyword extracted from the document and stores the associated documents;

a retrieval expression obtaining element that retrieves a retrieval expression;

a number of documents calculating element that specifies a plurality of objective keywords from within the extracted keywords stored in the document information storing element, and calculating a first number of all the associated documents, a second number of documents, within the associated documents, matching the retrieval expression, a third number of documents, within the associated documents, containing each of the objective keywords and matching the retrieval expression, and a fourth number of documents, within the associated documents, containing each of the objective keywords;

a degree of similarity determining element that determines a degree of similarity between the retrieval expression and each of the objective keywords based on a relationship between the first number, the second number, the third number and the fourth number for each of the objective keywords; and a degree of association determining element that obtains associate document information of a document containing any of the objective keywords as the extracted keyword, and determines a degree of association between the retrieval expression and each of the documents stored in the document information storing element based on the degree of similarity for each of the objective keywords obtained by the degree of similarity determining element and the associate document information.

2. The associate document retrieving apparatus as set forth in claim 1, wherein the degree of similarity determining element uses the extended mutual information method defined by equation (1) to determine the degree of similarity between the retrieval expression and each of the objective keywords:

$$\text{extended mutual information} = \log_2[(\alpha\gamma)/(\beta\delta)] \quad (1)$$

wherein $\alpha$, $\beta$, $\gamma$ and $\delta$ are the first number, the second number, the third number and the fourth number for each of the objective keywords, respectively.

3. The associate document retrieving apparatus as set forth in claim 1, wherein the degree of similarity determining element uses the extended t-score method defined by equation (2) to determine the degree of similarity between the retrieval expression and each of the objective keywords:

$$\text{extended t-score} = \alpha[(\alpha\gamma - \beta\delta)/(\beta\delta)] \quad (2)$$

wherein $\alpha$, $\beta$, $\gamma$ and $\delta$ are the first number, the second number, the third number and the fourth number for each of the objective keywords, respectively.

4. The associate document retrieving apparatus as set forth in claim 1, wherein the document information storing element associates at least one of various types of bibliographic items of each document with the document as one of the extracted keywords of the document.

5. The associate document retrieving apparatus as set forth in claim 1, wherein the number of documents calculating element selects the extracted keywords extracted from a document matching the retrieval expression as the objective keyword.

6. The associate document retrieving apparatus as set forth in claim 1, further comprising:

a retrieval expression transforming element that transforms the retrieval expression into a retrieval expression of a conjunctive normal form of a plurality of disjunctive clauses, wherein the number of documents calculating element calculates the second number, the third number and the fourth number for each of the disjunctive clauses included in the retrieval expression, the degree of similarity determining element determines the degree of similarity between each of the disjunctive clauses and each of the objective keywords, and the degree of association determining element determines the degree of association between the retrieval expression and each of the associated documents based on the degree of similarity between each of the disjunctive clauses and each of the objective keywords, and the associate document information.

7. An associate document retrieving apparatus that retrieves a document related to an inputted retrieval condition, comprising:

a document information storing element that associates each of a plurality of documents with a keyword extracted from the document and stores the associated documents;

a retrieval expression obtaining element that receives a retrieval expression;

a number of documents calculating element that specifies a plurality of objective keywords from within the extracted keywords stored in the document information storing element, and calculates a first number of documents, within the associated documents, matching the retrieval expression, a second number of documents, within the associated documents, containing each of the objective keywords and matching the retrieval expression, and a third number of documents, within the associated documents, containing each of the objective keywords;

a degree of similarity determining element that determines a degree of similarity between the retrieval expression and each of the objective keywords based on a relationship between the first number, the second number and the third number for each of the objective keywords; and a degree of association determining element that obtains associate document information of a document containing any of the objective keywords as the extracted keyword from the document information storing element and determines a degree of association between the retrieval expression and each of the associated documents based on the degree of similarity for each of the objective keywords and the associate document information.

8. The associate document retrieving apparatus as set forth in claim 7, wherein the degree of similarity determining element uses the extended Dice-coefficient method defined by equation (3) as the degree of similarity between the retrieval expression and each of the objective keywords:

$$\text{extended Dice-coefficient} = 2\beta/(\alpha + \gamma) \quad (3)$$

wherein $\alpha$, $\beta$, and $\gamma$ are the first number, the second number and the third number for each of the objective keywords, respectively.

9. The associate document retrieving apparatus as set forth in claim 7, wherein the document information storing element associates at least one of various types of bibliographic items of each document with the document as one of the extracted keywords of the document and stores the bibliographic items.

10. The associate document retrieving apparatus as set forth in claim 7, wherein the number of documents calculating element selects the extracted keywords extracted from a document matching the retrieval expression as the objective keyword.

11. The associate document retrieving apparatus as set forth in claim 7, further comprising:

a retrieval expression transforming element that transforms the retrieval expression received by the retrieval expression obtaining element into a retrieval expression of a conjunctive normal form of a plurality of disjunctive clauses, wherein the number of documents calculating element calculates the first number, the second number and the third number for each of the disjunctive clauses included in the retrieval expression, the degree of similarity determining element determines the degree of similarity between each of the disjunctive clauses and each of the objective keywords, and the degree of association determining element determines the degree of association between the retrieval expression and each of the associated documents based on the degree of similarity between each of the disjunctive clauses and each of the objective keywords, and the associate document information.

12. A storage medium readable by a computer, the storage medium storing a program of instructions executable by the computer to perform a function for retrieving a document related to a retrieval condition, the function comprising the steps of:

associating each of a plurality of documents with a keyword extracted from the document and storing the associated documents;

receiving a retrieval expression;

specifying a plurality of objective keywords from within the extracted keywords;

calculating a first number of all the associated documents, a second number of documents, within the associated documents, matching the retrieval expression, a third number of documents, within the associated documents, containing each of the objective keywords and matching the retrieval expression and a fourth number of documents, within the associated documents, containing each of the objective keywords;

determining a degree of similarity between the received retrieval expression and each of the objective keywords based on a relationship between the first number, the second number, the third number and the fourth number;

obtaining associate document information of a document containing any of the objective keywords as the extracted keyword; and determining a degree of association between the retrieval expression and each of the associated documents based on the degree of similarity for each of the objective keywords and the associate document information.

13. A storage medium readable by a computer, the storage medium storing a program of instructions executable by the computer to perform a function for retrieving a document related to a retrieval condition, the function comprising the steps of:

associating each of a plurality of documents with a keyword extracted from the document and storing the associated documents;

receiving a retrieval expression;

specifying a plurality of objective keywords from within the extracted keywords;

calculating a first number of documents, within the associated documents, matching the retrieval expression, a second number of documents, within the associated documents, containing each of the objective keywords and matching the retrieval expression, and a third number of documents, within the associated documents, containing each of the objective keywords;

determining a degree of similarity between the received retrieval expression and each of the objective keywords based on a relationship between the first number, the second number and the third number;

obtaining associate document information of a document containing any of the objective keywords as the extracted keyword; and determining a degree of association between the retrieval expression and each of the stored documents based on the degree of similarity for each of the objective keywords and the associate document information.

14. A method of retrieving a document related to a retrieval condition, comprising the steps of:

associating each of a plurality of documents with a keyword extracted from the document and storing the associated documents and extracted keywords;

receiving a retrieval expression;

specifying a plurality of objective keywords from within the stored extracted keywords;

calculating a first number of all the associated documents;

calculating a second number of documents, within the associated documents, matching the retrieval expression;

calculating a third number of documents, within the associated documents, containing each of the objective keywords and matching the retrieval expression;

calculating a fourth number of documents, within the associated documents, containing each of the objective keywords;

determining a degree of similarity between the received retrieval expression and each of the objective keywords based on a relationship between the first number, second number, third number and fourth number;

obtaining associate document information of a document containing any of the objective keywords as the extracted keyword; and determining a degree of association between the retrieval expression and each of the associated documents based on the degree of similarity for each of the objective keywords and the associate document information.

* * * * *